United States Patent [19]

Williams et al.

[11] 3,925,418

[45] Dec. 9, 1975

[54] HEMISOLVATE OF D-(–)-2-(P-HYDROXYPHENYL)GLYCYL CHLORIDE HYDROCHLORIDE AND PROCESS

[75] Inventors: Walter A. Williams, Jamesville; Herbert H. Silvestri, Dewitt, both of N.Y.

[73] Assignee: Bristol-Myers Company, New York, N.Y.

[22] Filed: June 19, 1974

[21] Appl. No.: 480,895

[52] U.S. Cl. .......................... 260/340.6; 260/544 M
[51] Int. Cl.² ........................................ C07D 319/12
[58] Field of Search ..................... 260/340.6, 544 N

[56] References Cited
UNITED STATES PATENTS 3,341,607   9/1967   Leston ........................ 260/340.6 X

*Primary Examiner*—Anton H. Sutto
*Attorney, Agent, or Firm*—David M. Morse

[57] ABSTRACT

A novel and improved process is provided for D-(–)-2-(p-hydroxyphenyl)glycyl preparation of D-(–)-2-(p-hydroxyphenyl)-glycyl chloride hydrochloride by reacting D-(–)-2-(p-hydroxyphenyl)glycine with phosgene in dioxane to form an N-carboxyanhydride and converting said anhydride to the desired chloride hydrochloride by treatment with gaseous hydrogen chloride. A novel dioxane hemisolvate of D-(–)-2-(p-hydroxyphenyl)glycyl chloride hydrochloride is also provided which when employed in the form of seed crystals in the above process gives product of greater density and stability in higher yield and with more consistently reproducible results.

4 Claims, No Drawings

HEMISOLVATE OF D-(-)-2-(P-HYDROXYPHENYL)GLYCYL CHLORIDE HYDROCHLORIDE AND PROCESS

BACKGROUND OF THE INVENTION

The preparation of acid chloride hydrochlorides from 2-phenylglycine and phenyl-substituted 2-phenylglycines by use of such reagents as phosphorous pentachloride and thionyl chloride has been reported in the literature. Such 2-phenylglycyl chloride hydrochlorides are of considerable value as acylating agents for the 6-amino and 7-amino group of 6-aminopenicillanic acid or 7-aminopenicillanic acid or derivatives thereof in producing semisynthetic penicillins and cephalosporins having 2-phenylglycine side chains. When the above-mentioned prior art procedures have been attempted with 2-phenylglycines having a hydroxy substituent in the phenyl ring, however, the chloride hydrochloride products are found to be produced in low yields and with low purities. The products produced, moreover, are found to have such poor physical crystalline properties that they are not suitable for use in the commerical production of penicillins and cephalosporins (see for example Ex. 14 in U.K. Patent Specification NO. 1,241,844).

SUMMARY OF THE INVENTION

It was an object of the present invention to provide a new and improved process for the preparation of 2-phenylglycyl chloride hydrochlorides having a hydroxy substituent in the phenyl ring and in particular a new and improved process for the preparation of D-(−)-2-(p-hydroxyphenyl)glycyl chloride hydrochloride.

The process provided by the present invention makes possible a practical method for preparing the desired chloride hydrochlorides in high yield and in high purity. Additionally, the crystalline products prepared according to the process of the present invention are found to have the physical properties necessary for efficient recovery from the reaction mixture, for good storage stability and for use on a commercial scale in preparing semisynthetic penicillins and cephalosporins.

More particularly, the present invention provides a process for the preparation of crystalline D-(−)-2-(p-hydroxyphenyl)glycyl chloride hydrochloride; which process comprises the consecutive steps of (1) reacting D-(−)-2-(p-hydroxyphenyl)glycine with an excess of phosgene with heating in a substantially anhydrous dioxane solvent to form in solution the anhydride of the formula

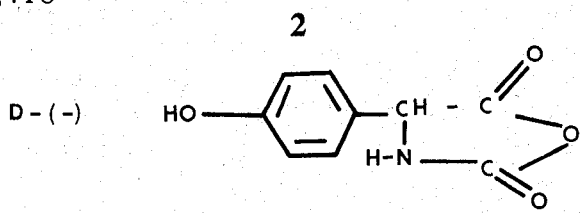

2. removing excess phosgene and HCl formed by reaction from the reaction mixture;

3. adding an excess of HCl gas to the cooled reaction mixture and 4. recovering the desired crystalline D-(−)-2-(p-hydroxyphenyl)glycyl chloride hydrochloride.

A preferred embodiment of the present invention is the process for preparing crystalline D-(−)-2-(p-hydroxyphenyl)glycyl chloride hydrochloride; which process comprises the consecutive steps of 1. reacting D-(−)-2-(p-hydroxyphenyl)glycine having a particle size of less than 200 mesh with at least 1.6 moles of phosgene per mole of D-(−)-2-(p-hydroxyphenyl)glycine in substantially anhydrous dioxane with heating for the minimum time necessary to form the anhydride of the formula

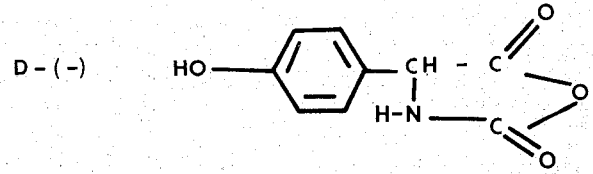

2. removing excess phosgene and HCl formed by reaction from the reaction mixture as rapidly as possible after formation of the anhydride;

3. adding a large excess of HCl gas to the reaction mixture at a temperature in the range of about 0°–5°C. for a period of time sufficient to form crystalline D-(−)-2-(p-hydroxyphenyl)-glycyl chloride hydrochloride; and 4. recovering the product from the reaction mixture.

The process of the invention may be represented by the following flow diagram.

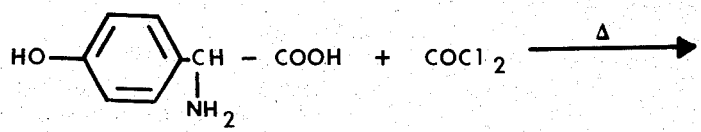

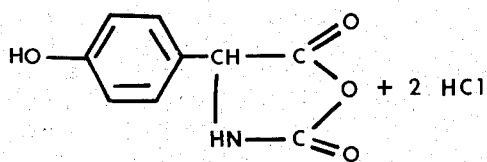

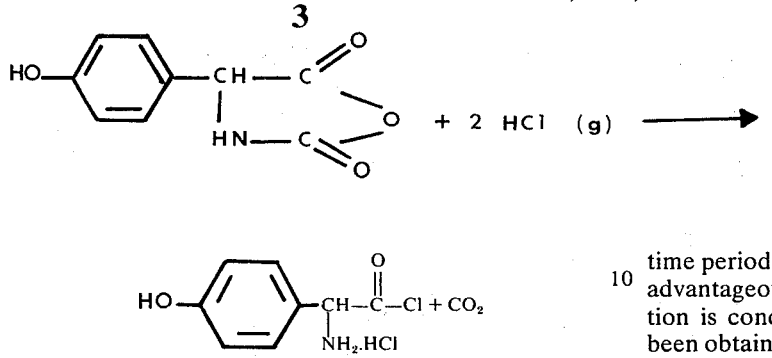

It can be seen from the above diagram that the process involves formation of an N-carboxyanhydride (Leuch's anhydride) by reaction of the p-hydroxyphenylglycine with phosgene and then conversion of the anhydride to the desired acid chloride hydrochloride by treatment with gaseous hydrogen chloride. The Leuch's anhydride intermediate is found to gradually decompose in the presence of phosgene and hence it is advantageous for maximum yields to have the reaction between the phosgene and p-hydroxyphenylglycine proceed as rapidly as possible and to remove excess phosgene and HCl by-product from the reaction mixture as soon as possible after formation of the anhydride intermediate.

The amino acid, i.e., D-(−)-2-(p-hydroxyphenyl)glycine, and phosgene are reacted in an anhydrous inert organic solvent. Suitable solvents are those anhydrous organic solvents which are (1) substantially chemically inert toward the p-hydroxyphenylglycine and phosgene, (2) solvents for the Leuch's anhydride intermediate and (3) substantially non-solvents for the acid chloride hydrochloride end-product. Examples of suitable solvents include dioxane, acetonitrile and tetrahydrofuran. The solvent preferred for maximum yields is dioxane since in addition to the above properties it has a boiling point sufficient to enable the reaction mixture to be heated to the preferred temperatures as described below. A substantially anhydrous solvent is used as the phosgene is sensitive to moisture. We prefer to use solvents having a moisture content of $\leq$ 0.02% water, most preferably those having a moisture content of $\leq$ 0.01%.

For maximum yields, the reaction rate of the phosgene addition step is maximized by proper adjustment of such factors as particle size and concentration of the p-hydroxyphenylglycine, temperature of the reaction mixture and concentration and rate of addition of phosgene. The D-(−)-2-(p-hydroxyphenyl)glycine is preferably ground and screened to a finely divided state so as to increase the surface area. Best results have been achieved when the p-hydroxyphenylglycine has a particle size of less thn 200 mesh, i.e., the amino acid is ground so that less than 3% is retained on a 200 mesh screen. An excess of phosgene is used to decrease reaction time. The phosgene is preferably used in an amount of at least 1.6 and most preferably at least 2.0 moles per mole of amino acid. The addition of phosgene to the p-hydroxyphenylglycine results in an exothermic reaction. To increase the reaction rate and minimize decomposition, however, the reaction mixture is preferably stirred and heat is added. The most advantageous results have been obtained when the phosgene is added as rapidly as possible with heating to about 60°–80°C. for the minimum time necessary to form the anhydride. Use of rapid phosgene addition and higher temperatures of about 60°–80°C. for short time periods, e.g., 5 minutes, is found to be particularly advantageous for obtaining good yields when the reaction is conducted on a large scale. Best results have been obtained when a fairly concentrated suspension of amino acid is employed, most preferably a concentration of about 10 g. amino acid per 80 – 100 ml. solvent.

Complete solubility of the amino acid is indicative of a complete reaction in the phosgene addition step. The reaction may also be monitored by appropriate techniques, e.g., thin layer chromatography, so as to indicate the minimum reaction time required for formation of the anhydride. By use of the preferred reaction conditions discussed above, practically quantitative yields of anhydride may be produced.

Since the Leuch's anhydride is found to gradually decompose in the presence of phosgene as mentioned previously, excess phosgene and the HCl by-product are preferably removed as rapidly as possible after completion of the phosgene addition step. Suitable methods for phosgene removal include purging with dry nitrogen gas and vacuum withdrawal.

Prior to addition of the gaseous HCl, it is found advantageous but not essential to remove a portion of the organic solvent, preferably by vacuum concentration. The solution may be concentrated so as to preferably remove up to a maximum of about 50–60% of the original solvent volume. Since the chloride hydrochloride product generally is at least partially soluble in the reaction solvent, it has been found desirable to add an antisolvent prior to the HCl addition step so as to maximize recovery of the crystalline product. Suitable antisolvents include such inert organic solvents as chlorinated hydrocarbons, e.g. methylene chloride, chloroform or ethylene dichloride and aromatic hydrocarbons, e.g., benzene, xylene or toluene. We have found toluene and methylene chloride especially convenient as antisolvents because of their widespread availability. Most advantageous results have been obtained when the dioxane reaction mixture is concentrated to a volume of up to about 50–60% of the original volume and sufficient toluene or methlene chloride antisolvent added so as to result in a solution having a dioxane:antisolvent volume-volume ratio of about 7:3.

To convert the Leuch's anhydride intermediate to the desired chloride hydrochloride product, an excess of gaseous hydrogen chloride is added, e.g., a tenfold molar excess. To increase the solubility of the HCl, the anhydride solution is cooled, preferably to a temperature in the range of about 0°–5°C. Best results have been obtained with a dioxane solvent when a large excess of HCl is used so as to obtain maximum protonation of the dioxane.

Recovery of the (p-hydroxyphenyl)glycyl chloride hydrochloride is carried out according to conventional procedures. Prior to, during or following HCl addition, seed crystals of the desired product are preferably added to induce crystallization. Progress of the HCl addition step may be followed by periodic testing with thin layer chromatography until conversion to the acid chloride hydrochloride is indicated. After sufficient HCl has been added, the solution is allowed to gradually warm to room temperature so as to allow slow crystallization and formation of the desired heavy dense crystalline product.

The crystalline product is filtered, washed, e.g., with toluene, dioxane, methylene chloride, and dried to give yields of up to about 82% in typical pilot plant runs.

During the course of conducting pilot plant runs of the above process, it was surprisingly and unexpectedly found following one such run that greatly improved results were obtained after having seeded with crystals of a particular batch of crystalline D-(−)-2-(p-hydroxyphenyl)-glycyl chloride hydrochloride which assayed (by GLC) 3–5% dioxane content and which had been stored at room temperature for 2½ weeks. The crystalline product obtained using this particular batch of seed crystals was analyzed and the results of IR and NMR analyses indicated that a new crystalline hemi-dioxane solvate of D-(−)-2-(p-hydroxyphenyl)glycyl chloride hydrochloride had been formed in which one molecule of dioxane is associated with every two molecules of D-(−)-2-(p-hydroxyphenyl)glycyl chloride hydrochloride. Subsequently, it was proposed that substantially nonsolvated chloride hydrochloride product containing from about 1–5% dioxane partially spontaneously changes to the more stable crystalline hemi-dioxane solvate when allowed to stand for a short time, e.g. 2½ weeks at room temperature.

The present invention, therefore, provides the crystalline hemi-dioxane solvate of D-(−)-2-(p-hydroxyphenyl)glycyl chloride hydrochloride containing one mole of dioxane for every two moles of D-(−)-2-(p-hydroxyphenyl)glycyl chloride hydrochloride.

The novel hemi-dioxane solvate of the present invention has a density of 0.5 g./ml. and a dioxane content as assayed by gas liquid chromatography of 14–17% which is within the assay variability of the theoretical 16.54% dioxane content. The solvate resists vacuum drying at 7mm absolute pressure and 40°C. for 24 hours, a condition which reduced the dioxane content of previous chloride hydrochloride samples to less than 1% dioxane.

The structure of the hemi-dioxane solvate has been established by NMR (60 MHz) analysis of the methyl ($d^3$) ester. The analysis shows a sharp singlet for dioxane at 3.62 ppm., the integral of which (8 protons) is exactly equal to that of the aromatic protons (4protons) centered at approximately 7.1 ppm. The only other signals are those due to the methine on the asymmetric carbon (5.0–5.1 ppm.), the $CD_3OH$ which includes all of the exchangeable protons and the typical five line pattern due to undeuterated methanol (an impurity in the NMR solvent) $CD_2H$—OD (centered at 3.3 ppm.).

The present invention also provides a process for the preparation of the crystalline hemi-dioxane solvate of D-(−)-2-(p-hydroxyphenyl)glycyl chloride hydrochloride; which process comprises the consecutive steps of 1. reacting D-(−)-2-(p-hydroxyphenyl)glycine having a particle size of less than 200 mesh with at least 1.6 moles of phosgene per mole of D-(−)-2-(p-hydroxyphenyl)glycine in substantially anhydrous dioxane with heating for the minimum time necessary to form the anhydride of the formula

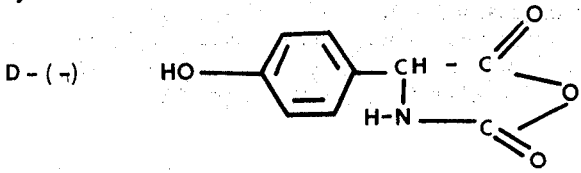

2. removing excess phosgene and HCl formed by reaction from the reaction mixture as rapidly as possible after formation of the anhydride;

3. adding a large excess of HCl gas to the reaction mixture at a temperature in the range of about 0°–5°C. while seeding with crystals of D-(−)-2-(p-hydroxyphenyl)glycyl chloride hydrochloride hemi-dioxane solvate, said HCl addition being conducted for a period of time sufficient to form crystalline D-(−)-2-(p-hydroxyphenyl)-glycyl chloride hydrochloride hemi-dioxane solvate; and 4. recovering the crystalline hemi-dioxane solvate from the reaction mixture.

Except for the use of the hemi-dioxane solvate of the chloride hydrochloride as seed crystals during the crystallization step, the above process is performed in the same manner as the process disclosed herein for preparation of non-solvated D-(−)-2-(p-hydroxyphenyl)glycyl chloride hydrochloride. Seeding with the hemi-dioxane solvate and recovery of the chloride hydrochloride in the form of the crystalline hemi-dioxane solvate (advantageously) results in higher overall yields of product. Thus, pilot plant runs of the process using the crystalline hemi-dioxane solvate as seed crystals gave average yields of about 89% chloride hydrochloride product (in the form of the hemi-dioxane solvate) as compared with average yields of about 82% of end product (nonsolvated form) in the same process when seeding is carried out with non-solvated chloride hydrochloride.

The density of the solvated product is 0.5 g./ml. as compared with product densities of between 0.2 and 0.4 g./ml. obtained by the process when non-solvated seed crystals are employed. Isolation of product having higher bulk density is advantageous since the product can be more economically and easily packed, stored and transported.

Use of the hemi-dioxane solvate in the above process has also resulted in more reproducible results during large scale runs with much greater run to run uniformity in bulk density and yield than when the process is conducted without the step of seeding with the hemi-dioxane solvate.

Stability data indicates that the crystalline hemi-dioxane solvate of D-(−)-2-(p-hydroxyphenyl)-glycyl chloride hydrochloride possesses greater storage stability than the corresponding non-solvated crystalline product.

The D-(−)-2-(p-hydroxyphenyl)glycyl chloride hydrochloride isolated either in the non-solvated crystalline form or as the crystalline hemidioxane solvate may be used to acylate the 6-amino or 7-amino groups of 6-aminopenicillanic acid or 7-aminocephalosporanic acid or derivatives thereof, e.g. derivatives of 7-aminocephalosporanic acid in which the acetoxy group is replaced by other nucleophiles by methods known in the literature.

Example 1

Preparation of D-(−)-2-(p-hydroxyphenyl)glycyl chloride hydrochloride 10.0 g. (∼0.06 mole) of D-(−)-2-(p-hydroxyphenyl)glycine was slurried in 100 ml. of dioxane. The slurry was stirred and $COCl_2$ (phosgene) was passed in while the slurry temperature was held at 50°–58°C. The $COCl_2$ was passed in for a total time of 3.5 hours. A yellow solution was obtained. The solution was purged with nitrogen to expel the excess $COCl_2$. HCl gas was bubbled through the solution for 2.5 hours. The solution was stirred and a small amount was diluted with some ether to obtain some crystals which were added to the batch as seed. The solution was stirred at 20°–25°C. for 16 hours. The resulting slurry of crystalline D-(–)-2-(p-hydroxyphenyl)glycyl chloride hydrochloride was filtered to collect the product. The filtercake was washed with dioxane and methylene chloride and then dried in a vacuum desiccator over $P_2O_5$. The yield of the title product was 7.3 g. The IR spectrum indicated that excellent product was obtained.

| Elemental Analysis: | | | | |
|---|---|---|---|---|
| | Cl | C | H | N |
| Theory | 31.93 | 43.14 | 4.09 | 6.37 |
| Found | 31.96 | 42.46 | 4.22 | 6.56 |

| Acid Chloride Assay | | |
|---|---|---|
| Acid Chloride | - | 98.6% |
| Free COOH | - | None |
| Free HCl | - | None |

Example 2

Preparation of D-(–)-2-(p-hydroxyphenyl)glycyl chloride hydrochloride using finely divided amino acid 10.0 g. of D-(–)-2-(p-hydroxyphenyl)glycine having a particle size of less than 200 mesh was slurried in 100 ml. dioxane. Phosgene was passed in for 10 minutes and then the reaction mixture was heated up to 64°C. with additional phosgene addition until a total of 1.8 moles $COCl_2$ had been used per mole of amino acid. After completion of the reaction and expulsion of the excess $COCl_2$, the solution was concentrated under vacuum. Toluene (25 ml.) was added and the solution was brought to a volume of 80 ml. with dioxane. The solution was chilled and slowly gassed with HCl for approximately 1 hour. Seed crystals were added and the reaction mixture was stirred and allowed to warm to room temperature. After continued stirring for several hours, the crystals were filtered, washed and dried over $P_2O_5$ to yield 11.65 g. (87.5%) of the title product.

Example 3

Preparation of D-(–)-2-(p-hydroxyphenyl)glycyl chloride hydrochloride using 2.0 moles phosgene per mole amino acid 100 g. D-(–)-2-(p-hydroxyphenyl)glycine screened to < 200 mesh was slurried in 1,000 ml. dioxane. $CoCl_2$ was added for about 15 minutes (123 g.) and the mixture heated to about 62°C. until the reaction was shown by TLC to be essentially complete. Excess $COCl_2$ was removed with $N_2$ and the solution was concentrated under vacuum to a volume of about 550 ml. To this concentrated solution was added 250 ml. toluene. The solution was cooled to 5°C. and HCl gas (190 g.) bubbled in slowly at 0°–5°C. for 2 hours. After stirring at 3°C. for 20 minutes, the reaction mixture was seeded and stirred for several more hours to form a heavy slurry. The slurry was filtered, washed with dioxane-toluene and methylene chloride and dried over $P_2O_5$ to form 112 g. (84.2%) of the title product.

Example 4

Preparation of D-(–)-2-(p-hydroxyphenyl)glycyl hydrochloride

A. Preparation of Leuch's Anhydride of D-(–)-2-(p-hydroxyphenyl)glycine 100 g. of D-(–)-2-(p-hydroxyphenyl) glycine (screened so that less than 3% was retained on a 200 mesh screen) was slurried in 1000 ml. dioxane. Phosgene was added for 25 minutes with heating up to about 80°C. whereupon an orange solution was produced. Excess phosgene was removed by house vacuum and the reaction mixture concentrated under vacuum to a volume of approximately 420 ml. Dioxane was added to give a volume of 500 ml. TLC indicated the presence of only Leuch's anhydride in the reaction mixture.

B. Preparation of chloride hydrochloride using methylene chloride - dioxane mixed solvent To 125 ml. of the Leuch's anhydride solution from Step A was added 62 ml. methylene chloride and 13 ml. dioxane. The solution was stirred, chilled to 5°C. and 50 g. HCl gas added over a 40 minute period at 0°–6°c. After stirring and seeding, a slurry of crystals formed. The reaction mixture was allowed to warm to room temperature and stirred overnight. The crystals were washed twice with 200 ml. dioxane-methylene chloride and 300 ml. methylene chloride and dried in a vacuum desiccator over $P_2O_5$ to give 28.4 g. of title product (85.5% yield).

| Assay | | |
|---|---|---|
| Acid chloride | = | 92.9% |
| Free COOH | = | 2.6% |
| Free HCl | = | 0.6% |
| Dioxane | = | 1.06% |

C. Preparation of chloride hydrochloride using toluene-dioxane mixed solvent

The procedure of Part B was repeated except that 65 ml toluene was substituted for the 62 ml. methylene chloride used therein. There was produced 28.7 g. (86.7% yield) of dried product which was characterized by IR as being the desired chloride hydrochloride.

| Assay | | |
|---|---|---|
| Acid chloride | = | 93.9% |
| Free COOH | = | 3.6% |
| Free HCl | = | 0.5% |

Example 5

Preparation of D-(–)-2-(p-hydroxyphenyl)glycyl chloride hydrochloride using slower HCl addition and dioxane-toluene mixed solvent To 125 ml of Leuch's anhydride solution prepared according to Example 4A was added 13 ml. dioxane and 70 ml. toluene. The solution was stirred, chilled at 0°C. and gassed at 0°–3°C. with 50 g. HCl over a 75 minute period. After stirring and seeding the chilled solution, a heavy slurry of crystals formed which when filtered, washed and dried gave 31.3 g. (95.5% yield) of excellent chloride hydrochloride product.

| Assay | | |
|---|---|---|
| Acid chloride | = | 92.3% |
| COOH | = | 5.9% |
| HCl | = | 1.6% |
| Dioxane | = | 1.12% |

Example 6

Preparation of D-(−)-2-(p-hydroxyphenyl)glycyl chloride hydrochloride using dioxane solvent The procedure of Example 5 was repeated except that (1) 10 ml. dioxane was added instead of the mixture of dioxane and toluene, (2) 70 g. HCl gas was used instead of 50 g. and (3) the solution was gassed for about 3 hours instead of 75 minutes. There was produced 22.7 g. (68.5% yield) of dried product which was identified by IR as being the desired chloride hydrochloride.

Example 7

Preparation of crystalline hemi-dioxane solvate of D-(−)-2-(p-hydroxyphenyl)glycyl chloride hydrochloride 27.3 Kg. of D-(−)-2-(p-hydroxyphenyl)glycine (200 mesh) is slurried in 273 liters of dry (KF < 0.1% $H_2O$) dioxane. The slurry is stirred and phosgene (31.5 Kg.) added as rapidly as possible (~ 35 minutes). Immediately after phosgene addition the reaction mixture is heated to about 65°C. with agitation until all solids have dissolved (< 10 minutes). Excess phosgene is then removed and the reaction volume concentrated by vacuum as quickly as possible (3 hours) to give 149 liters of solution. Toluene (70 liters) is added to the concentrated solution and the mixture is cooled to about 0°C. HCl gas (35.1 kg.) is added while maintaining the temperature below 5°C. Seed crystals of D-(−)-2-(p-hydrophenyl)-glycyl chloride hydrochloride hemi-dioxane solvate (~300 g.) are added to the solution and then additional HCl added to bring the total used to 60.0 kg. (approximately 5 hours total HCl addition time). At the conclusion of HCl addition, an additional 200 g. of the above-mentioned seed crystals are added and the reaction mixture is warmed to 20° C. over a 6 hour period and held at 20°C. with moderate agitation for 2-3 hours. The slurry is filtered and washed with dioxane, toluene and methylene chloride. The wet cake is dried to yield 38.292 Kg. of product which is identified by IR and NMR as D-(−)-2-(p-hydroxyphenyl)glycyl chloride hydrochloride hemi-dioxane solvate.

We claim:

1. The crystalline hemi-dioxane solvate of D-(−)-2-(p-hydroxyphenyl)glycyl chloride hydrochloride containing one mole of dioxane for every two moles of D-(−)-2-(p-hydroxyphenyl)glycyl chloride hydrochloride.

2. A process for the preparation of the crystalline hemidioxane solvate of D-(−)-2-(p-hydroxyphenyl)glycyl chloride hydrochloride; which process comprises the consecutive steps of
   1. reacting D-(−) 2-(p-hydroxyphenyl)glycine having a particle size of less than 200 mesh with at least 1.6 moles of phosgene per mole of D-(−)-2-(p-hydroxyphenyl)glycine in substantially anhydrous dioxane with sufficient heating and for the minimum time necessary to form in solution the anhydride of the formula

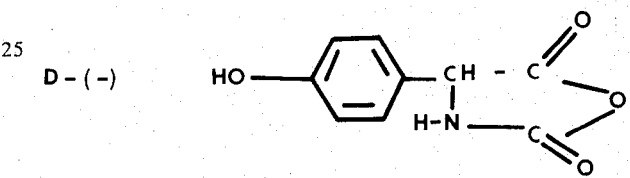

2. removing excess phosgene and HCl formed by reaction from the reaction mixture as rapidly as possible after formation of the anhydride;
   3. adding a large excess of HCl gas to the reaction mixture at a temperature in the range of about 0°–5°C. while seeding with crystals of D-(−)-2-(p-hydroxyphenyl)glycyl chloride hydrochloride hemi-dioxane solvate, said HCl addition being conducted for a period of time sufficient to form crystalline D-(−)-2-(p-hydroxyphenyl)glycyl chloride hydrochloride hemi-dioxane solvate; and
   4. recovering the crystalline hemi-dioxane solvate from the reaction mixture.

3. The process of claim 2 wherein the reaction mixture during the phosgene addition step is heated to a temperature of from about 60°–80°C.

4. The process of claim 3 wherein an antisolvent selected from toluene or methylene chloride is added to the solution of anhydride prior to the HCl addition step.

* * * * *